Fig. 1

INVENTOR
RALPH S. WHALEY
BY
ATTORNEY

INVENTOR
RALPH S. WHALEY
BY
Louis D. Caneau
ATTORNEY

INVENTOR
RALPH S. WHALEY
BY
ATTORNEY

Aug. 28, 1956 R. S. WHALEY 2,760,690
LIQUID MEASURING AND DISPENSING MACHINE
Filed Dec. 6, 1950 10 Sheets-Sheet 10

INVENTOR
RALPH S. WHALEY
BY
*Louis H. Lameau*
ATTORNEY

United States Patent Office 2,760,690
Patented Aug. 28, 1956

2,760,690

LIQUID MEASURING AND DISPENSING MACHINE

Ralph Seth Whaley, Seattle, Wash.

Application December 6, 1950, Serial No. 199,446

3 Claims. (Cl. 222—309)

This invention relates to a liquid measuring and dispensing machine.

A machine made according to this invention operates to dispense a predetermined or selected volume of liquid. In the form shown, it is adapted to dispense an effervescent liquid, more particularly, beer. The machine is installed in premises where beer is sold by the glass, from a barrel or container in which the beer is maintained under pressure. The machine is not only adapted to dispense a predetermined volume of beer, but also to produce a predetermined volume or "collar" of foam in the glass.

A feature of the machine is that it dispenses a predetermined volume of "solid" beer, and a predetermined volume or "collar" of foam.

Another feature is that the predetermined volume of beer is dispensed quickly without uncontrolled foaming.

Another feature is that the volume of solid beer to be dispensed and the depth or collar of foam may be varied (within a certain range) to meet lawful requirements.

Another feature is that the selected predetermined volume of solid beer to be dispensed is admitted under pressure into a measuring chamber under conditions which prevent the formation of foam, and the amount of foam required to provide the predetermined "collar" is produced outside of the measuring chamber.

Another feature of the machine is that the instrumentality controlling or initiating the successive operations or cycles of measuring a predetermined volume of beer to be dispensed, and of dispensing the same, is rendered ineffective to reverse either of such cycles, once initiated or begun, until such cycle is completed.

Another feature is that means are provided for "setting" and "sealing" as by Government agencies, so that it will measure accurately the predetermined volume of beer to be dispensed and guard against unauthorized resetting of or tampering with the volume to be dispensed.

Another feature is that the machine is so designed as to permit of the easy and convenient cleansing of such parts as are in contact with beer.

Another feature is that the beer to be dispensed is measured in a variable or expansible and contractible chamber in part defined by a piston, to measure a predetermined volume of solid or foamless beer on one stroke of the piston and, on the return stroke of the piston at a predetermined speed, to dispense beer with a predetermined foam content.

Another feature is that the machine is so designed that parts not requiring cleaning are left secured to the counter, and the parts requiring cleaning are easily and simply detached from the other parts.

Still another feature is that the parts requiring cleaning are easily and simply detached from the parts not requiring cleaning and which remain secured to the counter, without disturbing or affecting the setting of the volume-gauging mechanism.

In the drawings, wherein like numerals of reference indicate corresponding parts in the various figures.

Referring now by numerals to the drawings, 10 (see Figure 1) shows the body of the device.

Figure 1:
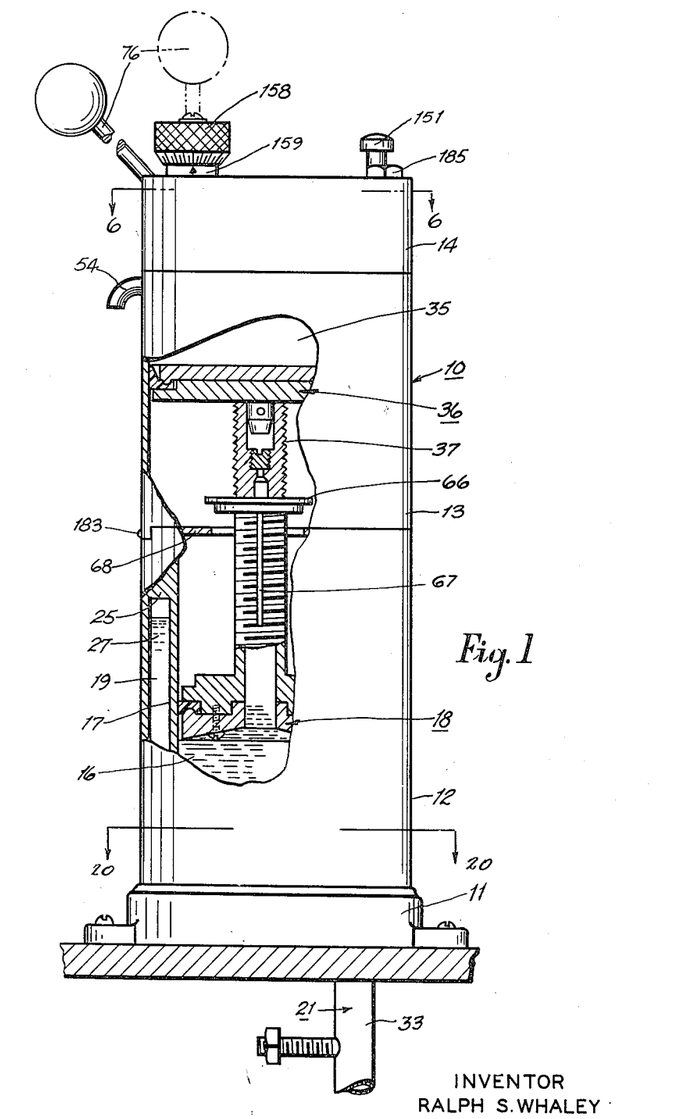
Figure 1 is an elevation of a device made according to the invention, parts being broken away and other parts being shown in section.

Preferably, the body comprises a base 11, a lower portion 12, and an upper portion 13. A cover or top 14 removably secured against the upper portion, serves to house a number of the operative parts, to be described later.

The base 11 may be connected to a plate 20 (see Figure 5) formed on the upper end of a two-duct draught tube 21 adapted operatively to be connected to the beer barrel or container (not shown) from which beer is to be dispensed or drawn, and also operatively to be connected to a source of air or other gas under pressure. Such other gas may be carbon dioxide. According to the usual practice, the beer in the barrel is under pressure.

Figure 5:
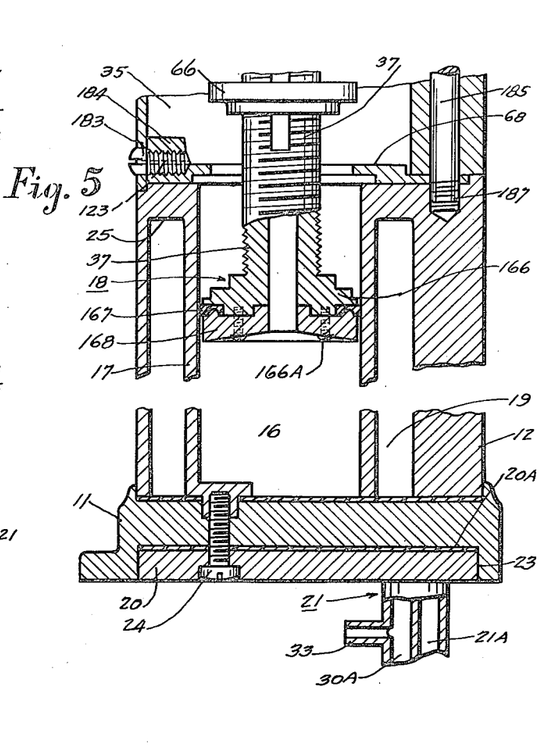
Figure 5 is a longitudinal section of the lower portion of the device.

The plate 20 fits into a recess 23 made into the lower face of the base 11, and the base is secured in the recess as by machine screws 24 (only one such screw being shown) passing through the plate and the base 11 and threaded into the lower portion 12 of the body 10. As shown, a gasket 20A may be used between the base 11 and the plate 20. If desired, the plate 20 may be welded in position.

The lower portion 12 of the body is formed to provide a vertical wall 17 adapted to define with the base 11, a cylinder 16 in which a piston 18 is slidable. The cylinder 16 is in effective communication with a substantially annular compartment or sump 19, defined at the top by a horizontal wall 25 and at the bottom by the base. The cylinder, below the piston, is in communication with the sump, as will be described later.

Figure 20:
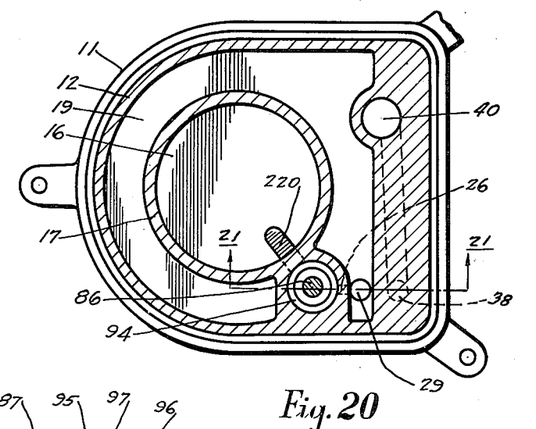
Figure 20 shows a section as on line 20—20 in Figure 1.

The cylinder 16 and the sump 19, enclose a body 27 (see Figure 1) of hydraulic fluid such as oil, and the oil in the sump (and therefore in the cylinder 16) is kept under pressure by operatively connecting the upper portion of the sump with a source of air under pressure. Thus, the lower portion 12 of the body is formed with a port 29 (see Figures 20 and 21) opening at its upper end into the sump and at its lower end into a duct 30 formed through the base 11. The duct 30 is in register with a duct 30A of the tube 21, the duct 30A in turn communicating with a nipple or the like 33 for operative connection with the source of air under pressure. If desired, carbon dioxide or other gas may be used in lieu of air.

As already stated, the sump is in communication with the cylinder 16, which for convenience will now be referred to as the oil cylinder, the effective communication being controlled by a valve 32, to be described later, operable in a bore 22. Thus, a duct or channel 220 (see Figures 20 and 21) made in the base connects the oil cylinder with the lower end of the bore 22, through a port 25. The bore in turn communicates with the lower end of the sump through a port 26.

The upper portion 13 of the body 10 is formed to provide a cylinder 35, in part defined by an upper transverse wall 38, in which a piston 36 is adapted to slide. For convenience, this cylinder will now be referred to as the beer cylinder. The piston 36 is operatively connected to the oil piston 18, to move therewith, by a rod or screw 37 (to be referred to later). The cylinder, above the piston 36, is adapted to receive beer from the source. Thus, the draught tube 21 aforesaid, more particularly its beer duct 21A, opens at its upper end into one end of a duct or channel 38 through the base 11; the other end of the channel is operatively connected with the lower end of a vertical duct 40 (see Figure 20) made through the lower portion 12 of the body 10. The upper end of the duct 40 is in register or opens into the lower end of a vertical duct 42 made in the upper portion 13 of the body (see Figures 20, 22, 23 and 24). The upper end of the duct 42 communicates with a lateral duct 44 opening into the cylinder 35, above the piston 36, through a port 43 in part defined by a conical valve seat. The port 43, and therefore the admission of beer under pressure into the cylinder to force the piston 36 downwardly, is controlled by a valve 45 (see Figure 18).

Figure 18:
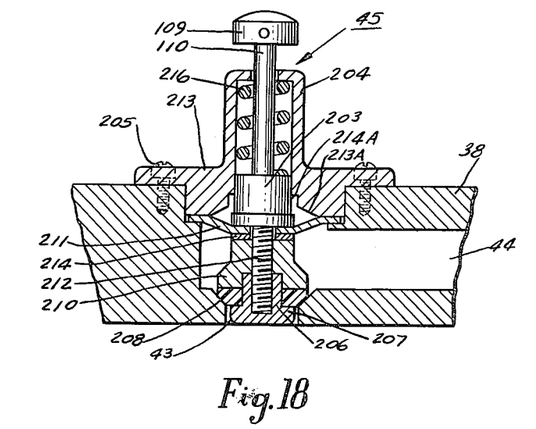
Figure 18 is a fragmentary view showing beer intake control valve.

The valve may be made as best shown in Figure 18. Thus, the valve stem 110 is formed with an intermediate enlarged portion 203 sliding in a housing 204 secured to the wall 38 of the upper portion 13 of the body, as with screws 205. To the lower reduced end 212 of the stem is threaded a collar 206 formed with a shoulder 207. A gasket 208 is seated on the shoulder 207 below and is engaged by a collar 210 threaded on the reduced portion 212. A diaphragm 211, which may be of rubber, perforated to receive the lower end 212 of the stem, is clamped between the base 213 of the housing 204 and the wall 38. The portion of the diaphragm surrounding the reduced end 212 is in turn clamped between the enlarged portion 203 and a washer 214 resting upon the collar or nut 210. A coil spring 216 tensioned between the upper wall of the housing and the enlarged portion 203 serves normally to hold the valve gasket 208 seated to close or seal the beer inlet port 43. The base 213, on its lower face, is formed with a recess 213A, substantially conical in shape, the recess being further recessed to present a stop to a shoulder 214A formed by slightly increasing the diameter of the enlarged portion 203. The engagement of this shoulder with the stop determines the uppermost raised (open) position of the beer valve.

In practice, the pressure of air or other gas to which the oil is subjected, is the same as that under which the beer is stored in the source or barrel, that is, 12 to 25 pounds per square inch. The arrangement is such that the force thus applied to the beer piston 36, plus the weight of the beer, will overcome the force of the oil in the cylinder 16 acting against the oil piston 18. Thus, as the normally closed, spring-loaded beer valve 45 is unseated to open the device to the source of beer, beer will force its way into the beer cylinder, forcing the piston downwardly (also forcing the oil piston 18 downwardly) and forcing oil into the sump 19.

The upper wall 38 of the upper portion 13 of the body is formed with a vertical bore 48 (see Figures 4, 23 and 24) in which a piston valve 50 (see Figure 4) is slidable. This valve controls a discharge port 52 opening into a spout 54. The valve is adapted to lower until its lower face is flush with the lower or inner face of the transverse wall 38, and to rise completely to open the port 52. The valve is also adapted to rise completely to open the port 52 before the piston 36 of the beer cylinder starts on its upward stroke from its fully lowered position. Preferably, the port 52 is positioned above the lower or inner face of the transverse wall 38, that is, above the uppermost possible position of the piston 36.

The volume of beer to be dispensed is a function of the downward displacement of the beer piston away from the upper end of its upward or dispensing stroke. Therefore, in order to determine the volume of beer desired to be dispensed, means must be provided for limiting or determining the lowered position of the piston. Thus, the rod or screw 37, which is operatively connected to both the beer piston 36 and the oil piston 18, as aforesaid, adjustably receives a nut 66. The downward travel of the beer piston is determined by the engagement of the nut 66 with a stop ring 68 suitably secured to the upper end of the lower portion 12 of the body say as by screws 68A (see Figure 13). Therefore, the volume of beer dispensed is a function of the position of the nut on the screw 37. The volume is increased by moving the nut toward the beer piston 36; it is decreased by moving the nut away from the piston 36.

Figure 11:
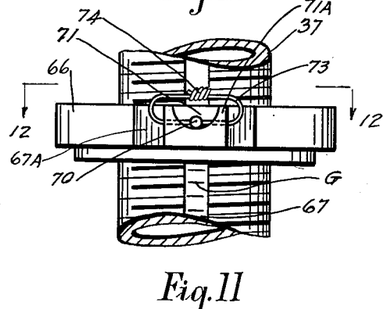
Figure 11 is a fragmentary elevation of the piston-carrying screw rod.

In order to calibrate volumes in terms of the positions of the nut on the screw 37, the screw is provided with longitudinal slots or recesses 67 cut into the threads, in which graduations G and numerals (not shown) are stamped (see Figure 11).

Figure 12:
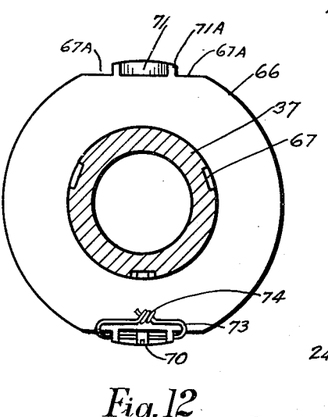
Figure 12 is a section on line 12—12 in Figure 11.

To lock the nut 66 on the screw 37 in a selected position, determining a selected volume of beer to be dispensed, a screw 70 may be threaded into the nut to engage in one of the recesses 67. If preferred, a metal plug may be used in lieu of a screw. The nut is notched on its periphery to define two oppositely-disposed, semi-circular recesses 71 adapted to expose the outer portion of the screw or plug 70, as best shown in Figures 11 and 12. The screw 70 is provided with a transverse hole (not shown) adjacent its outer end. The periphery of the nut is notched as at 67A, on opposite sides of the recesses 71, and the walls 71A thereby defined are provided with transverse holes (not shown).

To guard against tampering with the setting of the nut 66, a wire 73 may be inserted through the hole of the screw 70, through the holes of the walls 71A, and then looped up over the walls 71A so that its outer ends may be tightly drawn or twisted together as at 74 and permanently so secured as by an approved seal (not shown).

The operations of filling the beer cylinder with beer and of subsequently dispensing the same, are controlled by a manually-operated lever 76 movable in an arc of a circle between two extreme positions—"fill" and "draw." When the lever 76 is in normal or "draw" position, at the end of one beer dispensing cycle and before the beginning of the next cycle ("draw" position shown in dot and dash lines in Figure 1) the beer piston is in fully raised position, the discharge valve 50 is fully raised, and the beer valve 45 is closed (lowered). To fill the beer cylinder, the handle 76 is moved to its "fill" position, (shown in full lines in Figure 1) and while so moving, the discharge valve 50 lowers to close the port 52, and as the valve reaches its lowermost position, the beer valve 45 rises to open the port 43 and allow beer to enter the cylinder. As beer enters the chamber 35, the piston 36 goes down until the nut 66 engages the stop 63. On the opposite stroke of the handle 76 or the draw position, the beer valve first lowers to close the port 43, and then the valve 50 rises to clear the port 52 and open the beer cylinder to atmosphere. The pressure of the oil piston 18 raises the pistons 18 and 36 upward thereby dispensing the beer. The volume of beer forced into the beer cylinder is a measure of the downward displacement of the beer piston, and so is the volume of beer discharged. The device thus dispenses an exact, selected measured volume of beer each and every time the lever 76 is moved from its "fill" position to its "draw" position.

As already stated, the device is intended to produce a certain selected amount of foam in the selected volume of beer to be dispensed. The degree of foaming desired is accomplished by regulating the speed with which the beer is forced through the spout, and therefore by the speed at which the beer piston rises in the beer cylinder. In turn, the speed at which the beer piston rises depends upon the rate of flow of the oil, as controlled by the oil valve 32, from the sump 19 into the oil cylinder 16. Therefore, the effective position of the oil valve, to determine the rate of flow of the oil from the sump to the oil cylinder, is controlled by the operating handle 76 when in its "draw" position.

As shown, (see Figure 21) the upper end of the stem 86 of the oil valve, mounted for vertical movement in the bore 22 aforesaid, is provided with a nut or head 87. The lower end of the stem is formed with a reduced portion 89 on which the valve proper is slidably mounted. Conveniently, the valve includes a cup-like or dished member 90 slidable on the reduced portion 89 and in the open end of which is secured the valve seat-engaging, cone-shaped member or plug 91 of the valve. The member 90 is assembled to the reduced portion as by a nut 92. The valve proper or plug 91 is thus capable of movement relatively to the valve stem. The valve proper is urged toward its seated or closed position as by a coil spring 93 tensioned between a collar 94 threaded in the bore 22 and the upper face of the member or cup 90, and the upward displacement of the valve proper against the tensioned spring 93 is determined by the engagement of the valve proper or plug 91 with the lower extremity of the reduced portion 89 of the valve stem during the "draw" cycle. During the "fill" cycle, the valve 91 acts independently of the valve stem 89, which remains stationary, the valve being moved upwardly against the tension in the spring 93 by the oil passing through the port 25 from the oil cylinder 16 to the oil sump 19.

Figure 13:
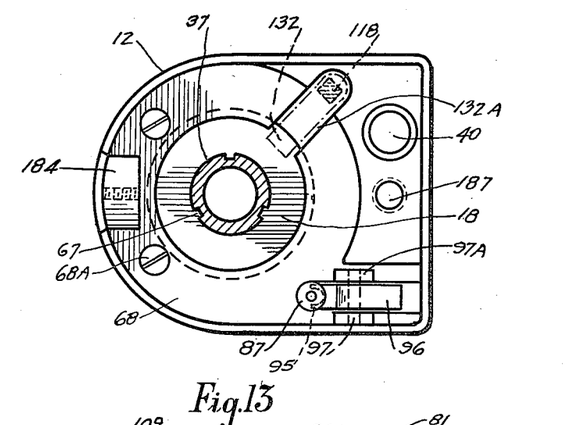
Figure 13 is a top plan view of the lower portion of the body of the device.
Figure 21:
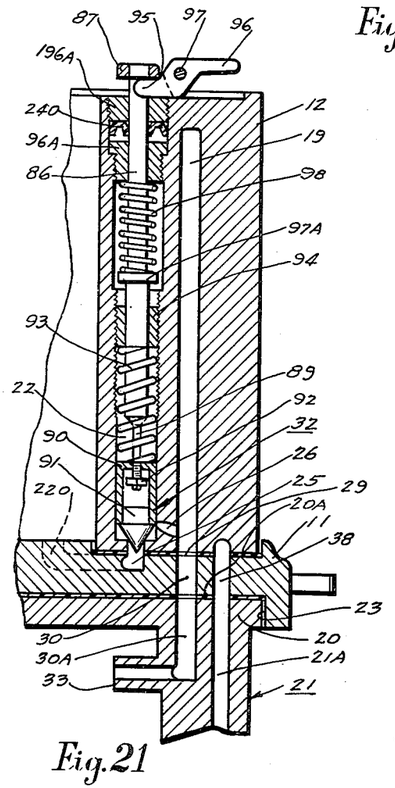
Figure 21 is a section as on line 21—21 in Figure 20.
Figure 22:
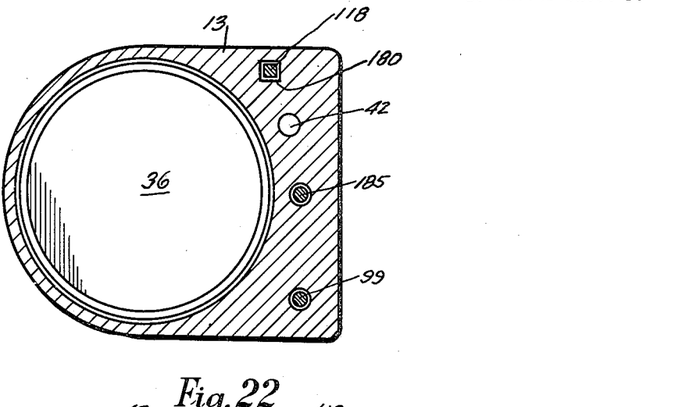
Figure 22 is a section as on line 22—22 in Figure 4.
Figure 23:
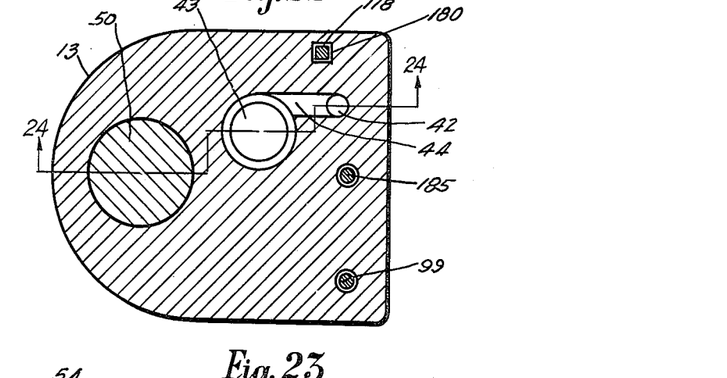
Figure 23 is a section on line 23—23 in Figure 4.
Figure 24:
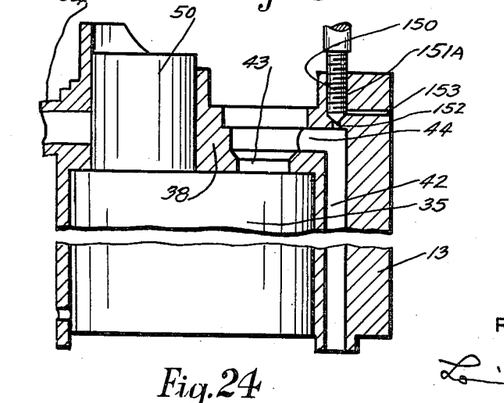
Figure 24 is a fragmentary view on line 24—24 in Figure 23, with the beer discharge valve omitted.

Adapted to extend under the head 87 of the valve is the bifurcated end 95 of a lever 96 pivotally supported as at 97 in lugs 97A rising from the ring 68 (see Figures 13 and 21). The lever normally is held in a horizontal position, by a spring 98 tensioned between a plug 96A threaded into the body portion 13 and a collar 97A formed on the valve stem (see Figure 21).

Figure 8:
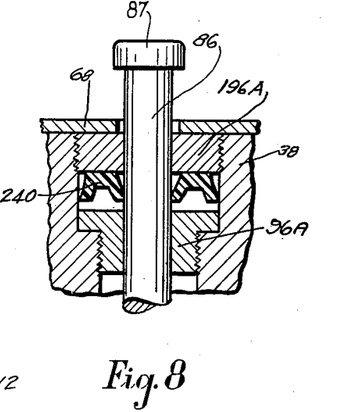
Figure 8 is a fragmentary section of the upper portion of the body of the device, showing a detail of construction.

Preferably, and as best seen in Figure 8, an annular gasket 240, of inverted channel cross section, is interposed between the plug 96A and a plug 196A threaded into the body portion 13, to serve as an oil seal.

Normally engaging, at its lower end, one end of the valve stem control lever 96, is a rod 99 (see Figures 22 and 23) mounted for vertical movement in a bore 100 made in the upper portion 13 of the body. The upper end of the rod 99 extends through and above the top of the upper portion 13 of the body and is formed with a head 101 (see Figure 9).

A coil spring 102 provided between the upper portion 13 and the head 101, is tensioned floatingly to support the rod so that normally, the control lever 96 is not affected by the rod. As the handle 76 is being moved from its "fill" position to its "draw" position to dispense the beer in the beer cylinder, the rod 99 is lowered against the spring 102, by a lever 112 (see Figures 6 and 9) actuating the lever 96 to raise the stem of the oil valve 32. The rod 99 is so lowered after the valve 50 has been raised to open the port 52.

To actuate the valves 50 and 45, and the control rod 99, in the required sequence as previously described, suitable means, responsive to the movement of the handle 76, are provided.

Figure 6:
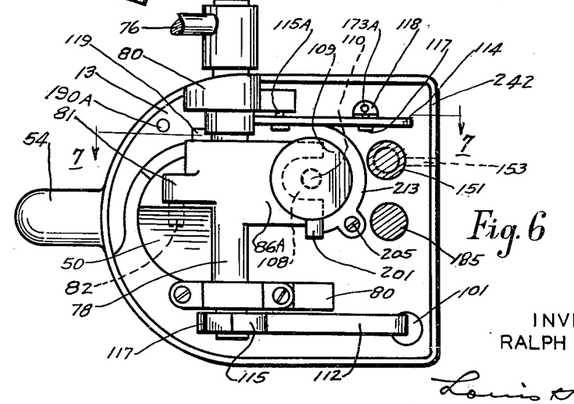
Figure 6 is a section on line 6—6 in Figure 1, but with cover removed, and signal removed (signal shown in Figure 10 only)
Figure 9:
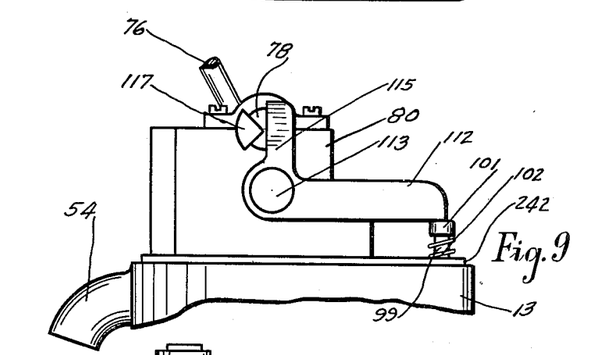
Figure 9 is a side elevation of the upper portion of the device, with cover removed.
Figure 14:
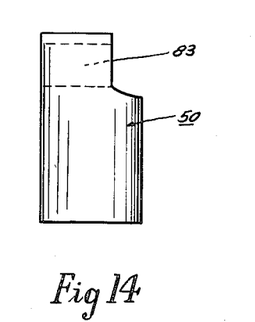
Figure 14 is a side elevation of the beer discharge valve.
Figure 15:
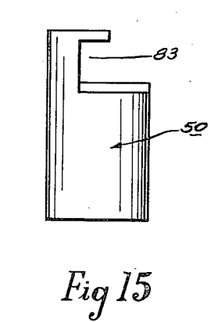
Figure 15 is another elevation of Figure 14.
Figure 16:
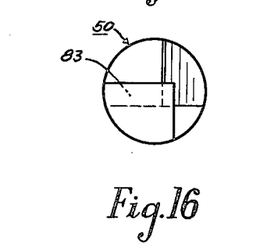
Figure 16 is a top plan view of Figure 14.
Figure 19:
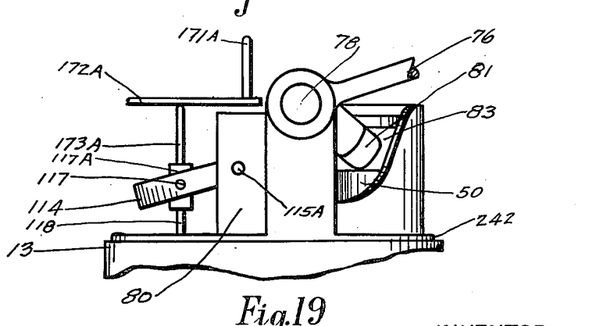
Figure 19 is a fragmentary side view of the device as on the side opposite that shown in Figure 9.

As shown, the handle 76 is fixed on one end of a shaft 78 journalled in a pair of bearings or brackets 80 rising from the upper portion 13 of the body (see Figures 6, 9 and 19). The shaft includes a lever 81 on one end of which is rotatably mounted a roller 82 (see Figure 6) adapted to enter a cam slot 83 (see Figures 14 to 16) formed in the valve 50 and to ride on the upper horizontal face of the slot to raise the valve by the movement of the handle from "fill" position to "draw" position—from left to right as seen in Figure 1.

The shaft 78 also includes a lever 86A (see Figure 6) the end of which is formed with a bifurcated end or jaw portion 108, in which the stem 110 of the beer valve is freely received, adapted to engage a head 109 formed on the upper end of the stem 110 of the beer valve 45 to raise the stem and unseat the valve. As the shaft 78 is rotated to raise the valve 50, the lever 86A is ineffective to raise the beer valve; on the other hand, when the shaft is rotated to lower the valve 50, the lever 86A operates to raise the beer valve, but only after a time interval or lag following the initiation of the downward movement of the valve 50.

The lever 112, aforesaid, pivotally supported at its forward end, as at 113, to one of the brackets 80 aforesaid, is supported at its rear end by the rod 99. The lever includes a portion 115 (see Figure 9) rising therefrom above its pivotal connection 113 with the bracket. The portion 115 is adapted to be engaged by a lug or cam 117 formed on one end of the actuating shaft 78 before the operating handle 76 has reached its "draw" position, to be moved by the cam to turn the lever 112 to depress or lower the rod 99 as the handle 76 completes its stroke to fully "draw" position. The arrangement is such that the cam 117 is not operative during the initial upward movement of the valve 50 but only before the valve reaches its fully raised position. When the valve 50 has reached its fully raised position, the rod 99 is fully lowered.

To insure that the handle 76, after being moved to "fill" position (to start the beer piston on its downward or beer-filling stroke) cannot be moved back to its "draw" position until the piston has completed its stroke, or conversely, that the handle cannot be moved back to its "fill" position from its "draw" position until the beer piston has completed its upward dispensing stroke, means are provided releasably to lock the handle in its "fill" position and "draw" position, respectively, until the beer piston has completed its effective stroke.

Figure 7:
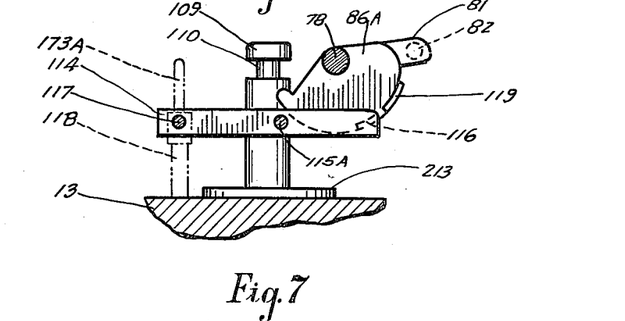
Figure 7 is a section on line 7—7 in Figure 6.
Figure 10:
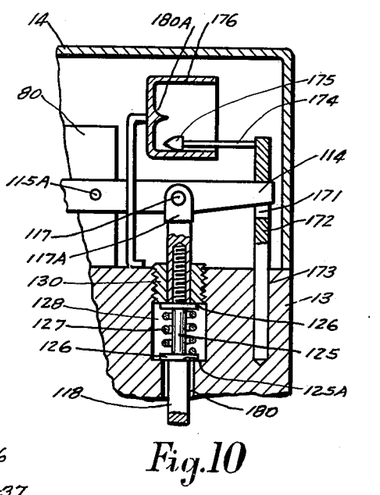
Figure 10 is a fragmentary, somewhat diagrammatic section of the upper portion of the device.

As shown, a lever 114 is pivotally supported as at 115A above the upper portion 13 of the body to one of the brackets 80 (see Figures 6, 7 and 10). One end—the forward end—of the lever is provided with a lug or shoulder 116 (see Figure 7). The lever, adjacent its other end, is pivotally connected, as at 117, to a jaw member 117A threaded to the upper end of a rod 118 (see Figure 10) mounted for vertical movement in a bore 180 formed in the upper portion 13 of the body. The rod slides in a bushing 130 threaded into the body portion 13 in the axis of the bore 180. The lug 116 is adapted effectively to be presented to one end or the other of an arcuately-shaped lug 119 (see Fig. 7) extending laterally from one side of the lever 86A of the shaft 78 (see Figure 7) when the handle 76 is in extreme "fill" or "draw" position, and to remain in such effective position until the beer piston has reached its fully lowered position or its fully raised position.

The lever 114 is spring-held in a normal or floating position, such that it will effectively present its lug or shoulder 116 to either end of the lug or shoulder 119 of the shaft 78, but will be moved out of the path of the lug 119 when the beer piston reaches the end of its beer filling stroke or the end of its beer dispensing stroke. Thus (see Figure 10), the rod 118 has a reduced portion 125 forming a shoulder 125A. Washers or followers 126, on the reduced portion, are adapted to be urged apart toward the shoulder and the bushing 130, respectively, by a coil spring 127 encircling the reduced portion. The spring and washer assembly is enclosed in a recess 128 formed by enlarging the bore 180. The rod is thus floatingly suspended in its normal position but is capable of upward and downward displacement.

Fixed to the lower end of the rod 118 is a member or foot 132a adapted to be received in a slot 132 through the stop ring 68 (see Figure 13) and to extend into the cylinder 35, below the piston 36, to lie in the path of both the nut 66 of the screw rod 37 and the oil piston 18, so as to be engaged by one or the other, according as to whether the beer piston is moving on its downward stroke or on its upward stroke, just prior to the completion of such downward or upward stroke. The foot, when depressed or lowered by the nut 66, lowers the rod 118 to turn the lever 114 to raise the lug 116 out of the path of the lug 119 of the shaft 78. On the other hand, the foot when raised by the oil piston, raises the rod 118 to turn the lever in an opposite direction to lower the lug 116 out of the path of the lug 119.

The lugs 116 and 119 are so dimensioned and arranged that the operating lever 76 is capable of a limited movement in the dispensing position so that the beer valve 45 is free to be opened or closed manually by the exertion of intermittent pressure on the rod 99 to seat and unseat the oil valve 32, without, however, allowing a reversal from the dispensing position until the beer chamber is emptied. In the "fill" position, there is not sufficient space between the lugs to allow any interruption of the filling of the chamber once the beer valve has been fully opened.

To fill the beer duct 42 and the transverse duct 44 (leading to the beer valve 45) with beer, when a fresh or new barrel of beer has been operatively connected to the device, air must be exhausted from the ducts as beer rises in the duct 42. Accordingly, an air release valve 150 is provided, conveniently at the upper end of the duct 42. As shown (see Figure 24) the stem 151 of the valve is threaded into a bore 151A made into the upper wall 38 of the upper portion 13 of the body. The bore is extended through the wall to provide a port 152 adapted to be closed or opened by turning the valve stem in one direction or the other. The lower end of the bore opens to atmosphere by means of a vent 153. Before the handle is manipulated to "fill" position to measure the first volume of beer from the new or fresh barrel, the valve 150 is operated to open the duct 42 to atmosphere, and the valve is left so open until solid beer issues from the vent 153, whereupon the valve is closed.

As already stated, the oil valve 32 includes a valve proper or seat-engaging plug 91, normally held seated to close the port 25, the valve being unseated by the oil forced out of the oil cylinder 16 as the oil piston 18 is forced downwardly. The valve plug seats itself again when the oil piston has reached the end of its downward stroke. On the other hand, the valve prevents the flow of oil from the sump, unless bodily raised by the valve stem 86. The valve stem 86 is raised by the operation of the handle 76 as the handle nears the end of its stroke toward "draw" position; more particularly, the cam 117 effectively engages the foam control lever 112 to turn the same and depress the rod 99, thereby tilting the lever 96 and therefore raising the valve stem.

Adjustably to determine the end of the stroke of the handle 76 toward "draw" position, a set screw 157 is threaded through the upper wall of the cover 14 of the body to present its lower extremity to the valve 50, thus determining the raised position of the valve and therefore, the position of the shaft 78.

Figure 17:
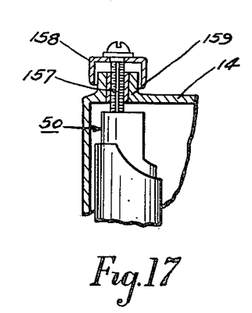
Figure 17 is a fragmentary section through the cover, showing the beer discharge valve in elevation.

Preferably, means are provided to calibrate the amount of foam produced in terms of the rotary position of the set screw. Thus (see Figure 17), the set screw carries a dish-shaped cap 158 telescoping a hub 159 formed on the cover 14 of the body. The cap is provided with graduations (see Figure 1) for selective register with a reference mark on the hub. In effect, the cap 158 serves as a dial.

Experience has shown that a certain amount of beer tends to remain lodged under the valve 50 and above the beer piston 36 and partly in the spout after the completion of the return stroke of the beer piston, possibly due to vacuum or surface tension. To break the vacuum or otherwise to dislodge such remnants of beer, the valve or piston 50 is moved down slightly but preferably quickly.

Preferably, and as shown (see Figure 4), the beer piston comprises a disc 160 from which depends a centrally-located, short portion 161 of circular cross-section ending in a tapered end. A suitable gasket 162 is held between the disc 160 and a second disc 163 secured to the disc 160 as by screws 121. The depending portion 161 of the disc 160 is received into the upper end of the screw 37, which is hollow, the piston thus resting upon the end of the screw. Thus, the beer piston conveniently can be operatively detached from the screw, as when it is desired to clean the piston, and can as conveniently and easily be operatively attached to the screw.

Preferably, also, and as shown (see Figure 5), the lower end of the screw 37 is formed with a flange 166 on the underside of which a suitable gasket 167 is held as by an annular ring or member 168 secured to the flange 166 as by screws 166A.

Figure 4:
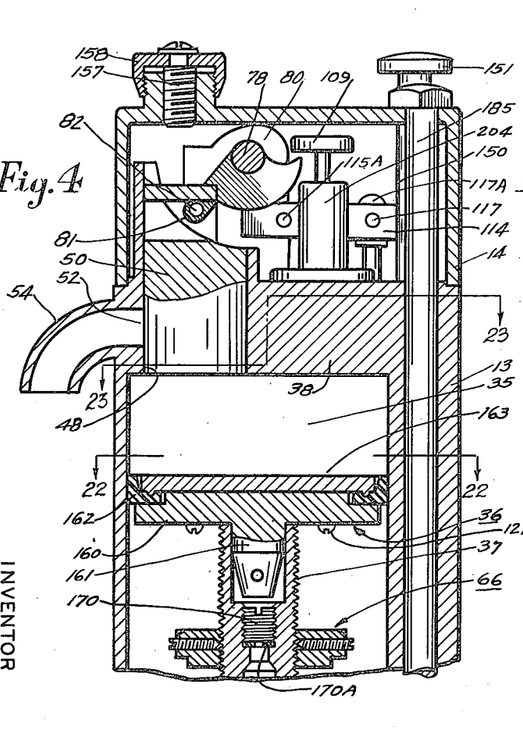
Figure 4 is a longitudinal section of an upper portion of the device.

Conveniently, the oil cylinder may be filled through the hollow screw 37, a plug 170 and gasket 170A serving effectively to seal the cylinder (see Figure 4).

Figure 6A:
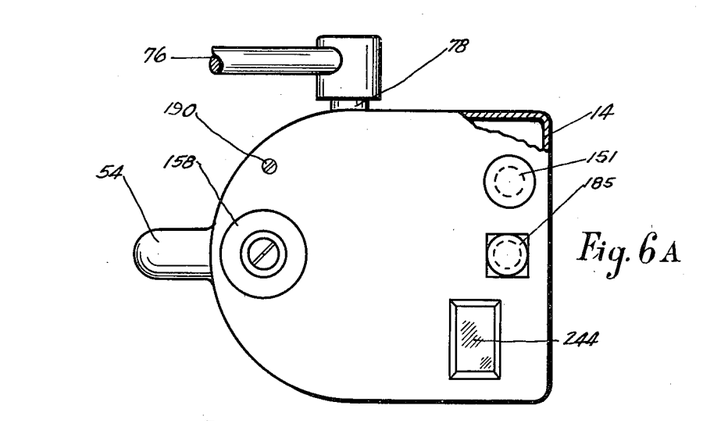
Figure 6A is a top plan view of the device.

Conveniently and easily to operatively connect or assemble the upper portion 13 to the lower portion 12 of the body 10, and to disconnect said two portions, a machine screw 183 is threaded into a boss 184 formed on one end (the front end) of the stop ring 68, the head of the screw being received into a hole made through the outer wall of the upper portion (see Figure 5). Rearwardly of the device, the upper portion 13 is secured to the lower portion 12 as by a single screw 185 passed through a vertical bore in the upper portion 13 and threaded at its lower end into a tapped hole 187 made into the upper end of the lower portion 12 (see Figure 13), the screw passing through the cover so that the upper portion 13 is held against the lower portion 12 by the cover 14. The cover is preferably secured or assembled to the upper portion 13 as by a screw 190 (see Figure 6A) threaded into a tapped hole 190A made into the upper wall of the upper portion 13 (see Figure 6). Thus, when it is desired to clean or cleanse the device, more particularly, the parts thereof which are in contact with the beer—requiring merely removing the upper portion 13 from the lower portion 12—the screw 183 is removed from the boss 184 and the screw 185 turned sufficiently to release the lower portion. The cover 14 remains secured to the upper portion 13, but is detached therefrom by removing the screw 190. Better to retain the cover 14 in operative position on the upper member 13, when attached thereto by the screw 190 the upper member is formed at its upper end to provide a peripheral shoulder 242 (see Figures 6 and 9) against which the inside surface of the vertical wall of the cover abuts.

The screw 183 is provided with an axial vent 123 through which air being compressed by the downward stroke of the beer piston 36 is evacuated.

Figure 2:
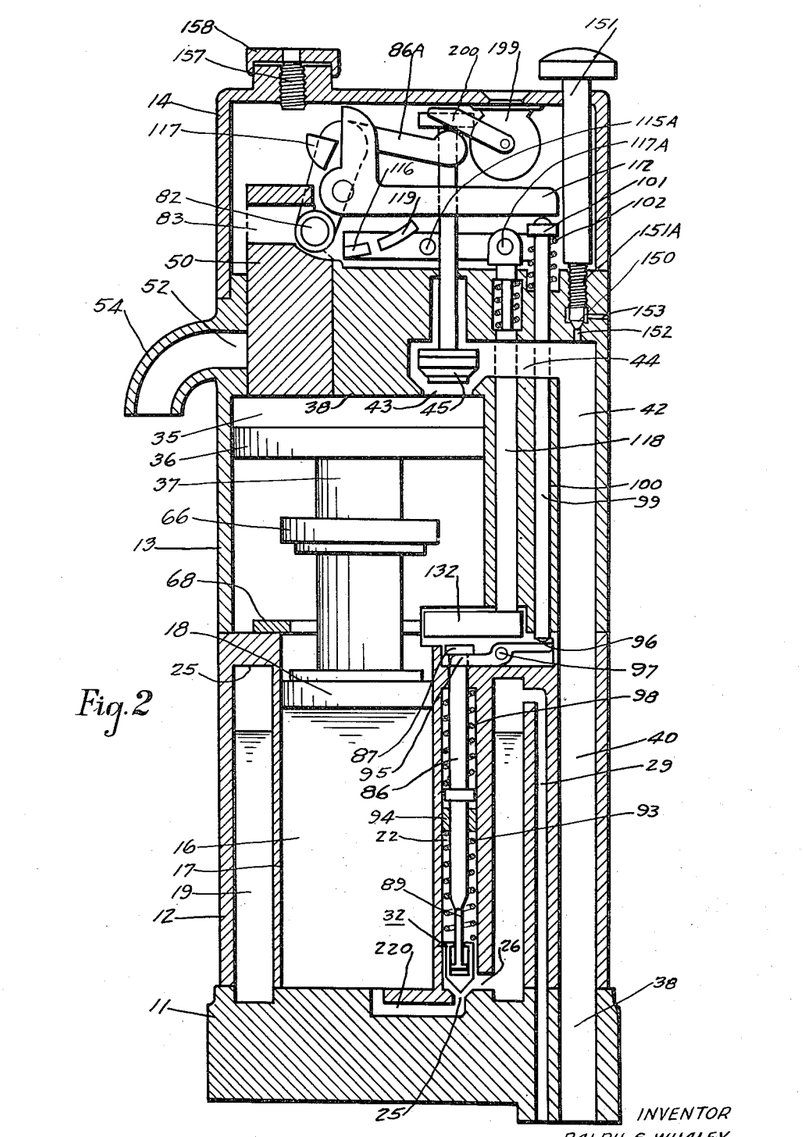
Figure 2 is a more or less diagrammatic, longitudinal section of Figure 1, showing the beer piston (and oil piston) on its downward stroke.
Figure 3:
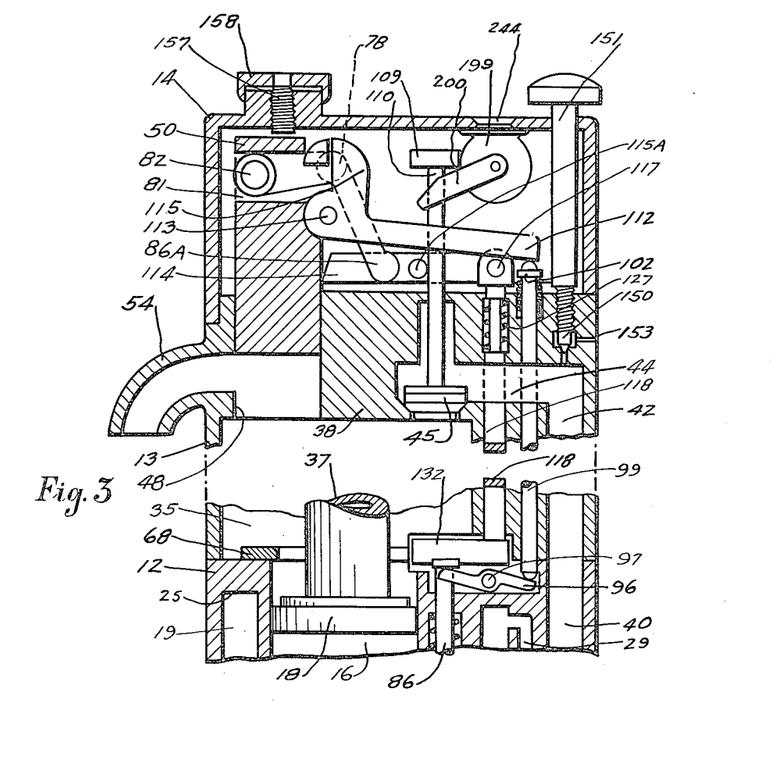
Figure 3 is a fragmentary view of Figure 2, but showing the oil piston on its upward stroke.

Preferably, a suitable counter 199 is used to record the number of glasses of beer dispensed out of each barrel (see Figures 2 and 3). The counter may be so disposed that its operating lever 200 is engaged and actuated by a pin or the like 201 carried by the lever 86 of the shaft 78 (see Figure 6). The counter may be read through a window 244 in the cover (see Figure 6A).

Means are preferably provided to indicate to the operator when the beer cylinder has been filled with beer, as when the beer piston has reached the end of its downward (or filling) stroke. For instance, a ball and knocker device may be provided, the device being effectively operated both by the beer piston 36 and the oil piston 18, alternately. Thus, as shown in Figure 10, the lever 114 extends into the slot 171 of a rod or weight 172 mounted for vertical movement in a bore 173 in the upper portion 13 of the body, so that an oscillatory movement of the lever will raise or lower the rod. The upper end of the rod carries a transverse flexible or resilient bar 174 to the end of which is fixed a knocker 175 (the outer end or edge of which is defined by two relatively slanted edges), for sounding a bell 176. The bell is formed with a V-shaped portion 180A projecting into the bell proper and lying in the path of the knocker. As the rod 172 is being raised (or lowered) by the lever 114, the knocker will be temporarily held against the portion 180A of the bell, building up resiliency in the bar 174, and when the rod has raised (or lowered) sufficiently to allow the knocker to clear the portion 180A, the knocker will strike the bell to sound the same.

In order to obtain optimum speed of repetitive dispensing without unwanted amounts of foam subsequent to the dispensing of the first drawing of beer, it has been found that a back pressure substantially equal to but preferably greater than that exerted by the beer against the inlet beer valve, must be generated in the beer chamber before the beer valve is opened, preferably by the use of a film of beer of a depth of about 1/32" being allowed to remain in the voids above the top of the beer piston, and communicating this pressure hydraulically against the beer valve and the top of the piston.

*Operation*

Before operatively connecting the new or fresh (full) barrel to the device, the handle 76 is moved to "draw" or dispensing position. When the handle is in this position, the valve 50 is fully open, the beer valve 45 is closed, the oil valve is in closed position, the beer piston 36 is in its raised position (being held in that position by the pressure of the oil in the oil cylinder acting against the oil piston 18), and the handle 76 is free to be moved toward "fill" position. The fresh barrel is now operatively connected to the device, the beer rising in the beer ducts to the beer valve. The air release valve 150 is now opened to exhaust the air trapped at the upper end of the beer duct, and then closed when solid beer begins to issue out of the vent 153. The device is now ready to be operated to measure and dispense the first "glass" of beer. The handle 76 is now moved toward "fill" position. The valve 50 will first close and then the beer valve 45 will open as the handle reaches its "fill" position. Beer will now force its way through the beer valve port 43 to enter the "contracted" beer chamber or cylinder, and the beer piston 36 will lower to increase or expand the beer chamber, until the nut 66 engages the stop ring 68. The piston will now come to a stop. As the beer piston 36 lowers, so does the oil piston 18 lower; in lowering, the oil piston forces oil out of the oil cylinder 27 through the port 25 (raising the oil valve 91 against the tension in the spring 93) and into the oil sump 19. Just as the beer piston began to move downwardly, the oil piston moved away from or released the foot 132 of the cam stop rod 118, and the lever 114 thereupon operated to lock the handle 76 from being moved back toward "draw" position. As the piston reaches it lowered position, as aforesaid, the nut 66 engages the foot 132 and lowers the cam stop rod 118, whereupon the lever 114 is operated to release the handle for movement back to "draw" position. As the handle is being moved toward "draw" position, the beer valve 45 first closes, the valve 50 then rises to open the beer cylinder to atmosphere to lower the beer to atmospheric pressure without agitation, and finally the foam control lever 112 is operated to lower the rod 99 and lift the oil valve 91 off its seat to control the flow of oil from the sump 19 to the oil cylinder. The oil piston will now rise in the oil cylinder at a speed responsive to the oil inflow into the oil cylinder as determined by the extent of the open position of the valve. Beer will now be lifted out of the device through the spout 54 by the upward movement of the beer piston.

When it is desired to clean the wall of the beer cylinder and the inside or upper face of the beer piston, which are the only parts of the device which require frequent cleaning, the screw 185 is unscrewed from the lower body portion 12, the screw 183 is removed, and the upper body portion 13 (with the cover 14 remaining attached thereto) is detached from the lower body portion 12.

The beer piston 36, which remained within the beer cylinder, is now removed from the cylinder, so that both cylinder and piston may be easily and conveniently cleaned.

To re-assemble the device after cleaning, the beer piston is inserted into the beer cylinder and pushed up against the upper wall of the cylinder, the upper portion lowered over the lower portion until it is effectively seated upon the lower portion, and the two portions then locked together by the screws 183 and 185.

What I claim is:

1. In a machine for measuring and dispensing a gas-charged liquid, a body having a vertical bore closed at its upper end by a transverse wall, a piston slidable in said bore and defining with said bore and with said transverse wall a chamber expansible upon lowering of said piston and contractible upon rising of said piston, means applying pressure to said piston yieldingly resisting lowering thereof, a port for the admission of gas-charged liquid to lower said piston and measure a predetermined volume of liquid, a valve controlling said port, a vertical duct of equal cross sectional area throughout its length through said transverse wall forming a port, a discharge spout having one end port opening into said vertical duct above the plane of the surface of said transverse wall which defines the upper confines of said chamber, a plunger valve displaceable in said vertical duct operable effectively to close and open said discharge spout port, and manually-operable means for actuating said valves in alternation effectively to close and open said discharge spout port, said last named means limiting the lowering of said plunger valve so that when moved to its closed position said plunger valve extends below said discharge spout port to displace remnants of undispensed liquid in said duct back into the chamber when contracted and build up hydraulic pressure therein before said first valve is operated to admit liquid.

2. In a machine for measuring and dispensing a gas-charged liquid, a body having a vertical bore closed at its upper end by a transverse wall, a piston slidable in said bore and defining with said bore and with said transverse wall a chamber expansible upon lowering of said piston and contractible upon rising of said piston, means adjustably limiting the lowering of said piston selectively to determine the volume of said chamber when expanded, means applying pressure to said piston yieldingly resisting lowering thereof, a port through said transverse wall for the admission of gas-charged liquid to lower said piston and measure a predetermined volume of liquid, a valve controlling said port, a vertical duct of equal cross-sectional area throughout its length through said transverse wall forming a port, a discharge spout having one end port opening into said vertical duct above the plane of the surface of said transverse wall which defines the upper confines of said chamber, a plunger valve displaceable in said vertical duct operable effectively to close and open said discharge spout port, and manually-operable means for actuating said valves in alternation effectively to close and open said discharge spout port, said means limiting the lowering of said plunger valve so that when moved to its closed position said plunger valve extends below said discharge spout port to displace remnants of undispensed liquid in said duct back into the chamber when contracted and build up hydraulic pressure therein before said first valve is operated to admit liquid.

3. In a machine for measuring and dispensing a gas-charged liquid, a body having a vertical bore closed at its upper end by a transverse wall, a piston slidable in said bore and defining with said bore and with said transverse wall a chamber expansible upon lowering of said piston and contractible upon rising of said piston, a port adapted operatively to be connected to a pressurized container enclosing the gas-charged liquid to be dispensed for admission of liquid to lower said piston and measure a predetermined volume of such liquid, a valve controlling said port, means in said body including a piston adapted to move with said first piston and forming a second chamber contractible as said first chamber expands and expansible as said first chamber contracts, a liquid in said second chamber adapted to apply pressure against said second piston yieldingly to resist the lowering of said first piston, said second chamber being adapted operatively to be connected to the pressurized container so that the pressure of said liquid is equal to that of the gas-charged liquid, a vertical duct through said transverse wall forming a port, a discharge spout having one end port opening into said vertical duct above the plane of the surface of said transverse wall which defines the upper confines of the first chamber, a plunger valve displaceable in said vertical duct operable effectively to close and open said discharge spout port, and manually-operable means for actuating said valves in alternation effectively to close and open said discharge spout port, said means limiting the lowering of said plunger valve so that when moved to its closed position said plunger valve extends below said discharge spout port to displace remnants of undispensed liquid into the chamber when contracted and build up hydraulic pressure therein before said first valve is operated to admit liquid.

References Cited in the file of this patent

UNITED STATES PATENTS

| | | |
|---|---|---|
| 993,436 | Burke et al. | May 30, 1911 |
| 1,075,898 | Champ et al. | Oct. 14, 1913 |
| 1,609,015 | Engbrecht | Nov. 30, 1926 |
| 1,648,163 | Childs | Nov. 8, 1927 |
| 1,739,195 | Wheeler | Dec. 10, 1929 |
| 1,782,704 | Woodruff | Nov. 25, 1930 |
| 1,913,062 | Wheeler | June 6, 1933 |
| 2,151,110 | Hutsell | Mar. 21, 1939 |
| 2,199,405 | Hutsell | May 7, 1940 |
| 2,300,110 | De Hoog | Oct. 27, 1942 |
| 2,388,662 | Anderson et al. | Nov. 13, 1945 |